United States Patent
Antchak et al.

(10) Patent No.: US 9,989,103 B2
(45) Date of Patent: Jun. 5, 2018

(54) ISOLATION PULLEY WITH OVERRUNNING AND VIBRATION DAMPING CAPABILITIES

(75) Inventors: John R. Antchak, Aurora (CA); Warren Williams, Oakville (CA); James W Dell, Newmarket (CA)

(73) Assignee: Litens Automotive Partnership, Woodbridge, ON (CA)

( * ) Notice: Subject to any disclaimer, the term of this patent is extended or adjusted under 35 U.S.C. 154(b) by 200 days.

(21) Appl. No.: 13/805,085

(22) PCT Filed: Jun. 22, 2011

(86) PCT No.: PCT/CA2011/000726
§ 371 (c)(1),
(2), (4) Date: Dec. 18, 2012

(87) PCT Pub. No.: WO2011/160208
PCT Pub. Date: Dec. 29, 2011

(65) Prior Publication Data
US 2013/0087428 A1    Apr. 11, 2013

Related U.S. Application Data (60) Provisional application No. 61/358,540, filed on Jun. 25, 2010.

(51) Int. Cl.
*F16D 7/00*    (2006.01)
*F02B 67/06*    (2006.01)
(Continued)

(52) U.S. Cl.
CPC ............ *F16D 7/00* (2013.01); *F02B 67/06* (2013.01); *F16D 7/022* (2013.01); *F16D 13/76* (2013.01);
(Continued)

(58) Field of Classification Search
USPC ....... 192/41 S, 56.62, 54.2, 55.1, 55.5, 45.1, 192/46, 110 B, 55.51, 55.3; 474/13, 161,
(Continued)

(56) References Cited

U.S. PATENT DOCUMENTS

| 5,139,463 | A | 8/1992 | Bytzek et al. |
| 5,156,573 | A | 10/1992 | Bytzek et al. |

(Continued)

FOREIGN PATENT DOCUMENTS

| WO | WO-2003104673 A1 | 12/2003 |
| WO | WO-2004011818 A1 | 2/2004 |

(Continued)

OTHER PUBLICATIONS

International Search Report and Written Opinion for PCT/CA2011/000726, dated Sep. 29, 2011, ISA/CA.
(Continued)

*Primary Examiner* — David J Hlavka
(74) *Attorney, Agent, or Firm* — Millman IP Inc.

(57) ABSTRACT

A decoupler having an input hub, an output member, a one-way clutch, and at least one isolation spring. Rotary power is transmitted in a predetermined rotational direction from the input hub, through the one-way clutch, through the isolation spring and to the output member. A method for forming a decoupler is also provided.

14 Claims, 4 Drawing Sheets

(51) Int. Cl.
*F16D 7/02* (2006.01)
*F16D 13/76* (2006.01)
*F16D 41/20* (2006.01)
*F16H 55/36* (2006.01)
*F16F 15/123* (2006.01)

(52) U.S. Cl.
CPC .......... *F16D 41/206* (2013.01); *F16F 15/123* (2013.01); *F16H 55/36* (2013.01); *F16H 2055/366* (2013.01); *Y10T 29/49826* (2015.01)

(58) Field of Classification Search
USPC ................................ 474/70, 135, 199, 74, 69
See application file for complete search history.

(56) References Cited

U.S. PATENT DOCUMENTS

| | | | |
|---|---|---|---|
| 5,722,909 A | | 3/1998 | Thomey |
| 6,044,943 A | | 4/2000 | Bytzek et al. |
| 6,083,130 A | | 7/2000 | Mevissen et al. |
| 6,659,248 B2 | * | 12/2003 | Terada ........................ 192/41 S |
| 7,070,033 B2 | | 7/2006 | Jansen et al. |
| 7,153,227 B2 | | 12/2006 | Dell et al. |
| 7,207,910 B2 | | 4/2007 | Dell et al. |
| 7,275,630 B2 | * | 10/2007 | Jansen et al. ............. 192/110 R |
| 7,591,357 B2 | * | 9/2009 | Antchak et al. ............. 192/55.5 |
| 7,618,337 B2 | | 11/2009 | Jansen et al. |
| 7,624,852 B2 | | 12/2009 | Mevissen et al. |
| 7,712,592 B2 | | 5/2010 | Jansen et al. |
| 7,766,774 B2 | | 8/2010 | Antchak et al. |
| 8,006,819 B2 | | 8/2011 | Dell et al. |
| 8,021,253 B2 | | 9/2011 | Dell et al. |
| 8,485,331 B2 | * | 7/2013 | Parsons et al. .................. 192/35 |
| 8,678,157 B2 | * | 3/2014 | Ward et al. .................. 192/55.1 |
| 2006/0035740 A1 | | 2/2006 | Lehtovaara et al. |
| 2006/0144664 A1 | | 7/2006 | Antchak et al. |
| 2007/0037644 A1 | | 2/2007 | Mevissen et al. |
| 2009/0176608 A1 | | 7/2009 | Jansen et al. |
| 2010/0140044 A1 | | 6/2010 | Antchak et al. |
| 2011/0224038 A1 | | 9/2011 | Antchak et al. |

FOREIGN PATENT DOCUMENTS

| | | |
|---|---|---|
| WO | WO-2007003052 A1 | 1/2007 |
| WO | WO-2010099605 A1 | 9/2010 |
| WO | WO-2011072391 A1 | 6/2011 |
| WO | WO-2011147024 A1 | 12/2011 |

OTHER PUBLICATIONS

English translation of an Office Action issued by the Japanese Patent Office for related JP Application No. 2013-515644.

* cited by examiner

Fig-6

ISOLATION PULLEY WITH OVERRUNNING AND VIBRATION DAMPING CAPABILITIES

CROSS-REFERENCE TO RELATED APPLICATIONS

This application is a 371 U.S. National Stage of International Application No. PCT/CA2011/000726, filed on Jun. 22, 2011, which claims priority to U.S. Provisional Application No. 61/358,540, filed on Jun. 25, 2010. The contents of the above applications are incorporated herein by reference in their entirety.

INTRODUCTION

The present disclosure generally relates to an isolation pulley with over-running and vibration damping capabilities.

Over-running decouplers are disclosed in U.S. Patent Application Publication Nos. 2010/0140044 and 2007/0037644. While such over-running decouplers are well suited for their intended purposes, there remains a need in the art for over-running decouplers that provide for torsional isolation.

SUMMARY

This section provides a general summary of the disclosure, and is not a comprehensive disclosure of its full scope or all of its features.

In one form the present teachings provide a decoupler that includes an input hub, an output member and a clutch and isolation system having a one-way clutch and a torsional isolator. The one-way clutch has a clutch input structure, a clutch spring, a carrier, and a clutch output structure. The clutch input structure is fixedly coupled to the input hub for rotation therewith. The clutch spring is formed of wire and has a plurality of coils and a first end that is mounted to the carrier. The carrier is non-rotatably mounted to the input hub and orients an axial end face of the wire that forms the first end of the clutch spring against the clutch input structure. The clutch output structure has a clutch surface. The coils of the clutch spring are configured to expand against the clutch surface to transmit rotary power from the input hub to the clutch output structure in a first rotational direction. The coils of the clutch spring are configured to contract to permit the clutch output structure to overrun the input hub in the first rotational direction. The torsional isolator includes an input driver, an output driver and at least one spring that is configured to transmit torque in the first rotational direction between the input driver and the output driver. The input driver is coupled to the clutch output structure for rotation therewith. The output member is coupled to the output driver for rotation therewith. The at least one spring of the torsional isolator is disposed radially outwardly of the clutch spring.

In another form, the teachings of the present disclosure provide a method for forming a decoupler. The method can include: mounting a torsional isolating spring concentrically about a clutch spring of a one-way clutch, the one-way clutch being drivingly coupled to an input hub and configured to transmit rotary power between the input hub and the torsional isolating spring in a predetermined rotational direction; and balancing the decoupler to a predetermined rotational imbalance such that the decoupler is rotationally imbalanced when no torsional load is carried by the decoupler and the rotational imbalance of the decoupler decreases as a torsional load carried by the decoupler increases to a predetermined torsional load.

In still another form, the teachings of the present disclosure provide a decoupler having an input hub, an output member, a one-way clutch, and at least one isolation spring. Rotary power is transmitted in a predetermined rotational direction from the input hub, through the one-way clutch, through the isolation spring and to the output member.

Construction of a decoupler in this manner can have several advantages, depending on the final configuration of the decoupler. For example, it may be possible to reduce the overall size of the one-way clutch relative to the prior art so that the one-way clutch is less costly. As another example, it may be possible to integrate a relatively larger spring into the decoupler, which can have cost advantages (as compared to a decoupler employing multiple springs) and/or provide a different spring rate that may not be easily attainable by other spring configurations. Other advantages not expressed herein may also be obtained.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. Similar or identical elements are given consistent identifying numerals throughout the various figures.

Corresponding reference numerals indicate corresponding parts throughout the several views of the drawings.

DETAILED DESCRIPTION OF THE VARIOUS EMBODIMENTS

Figure 1:
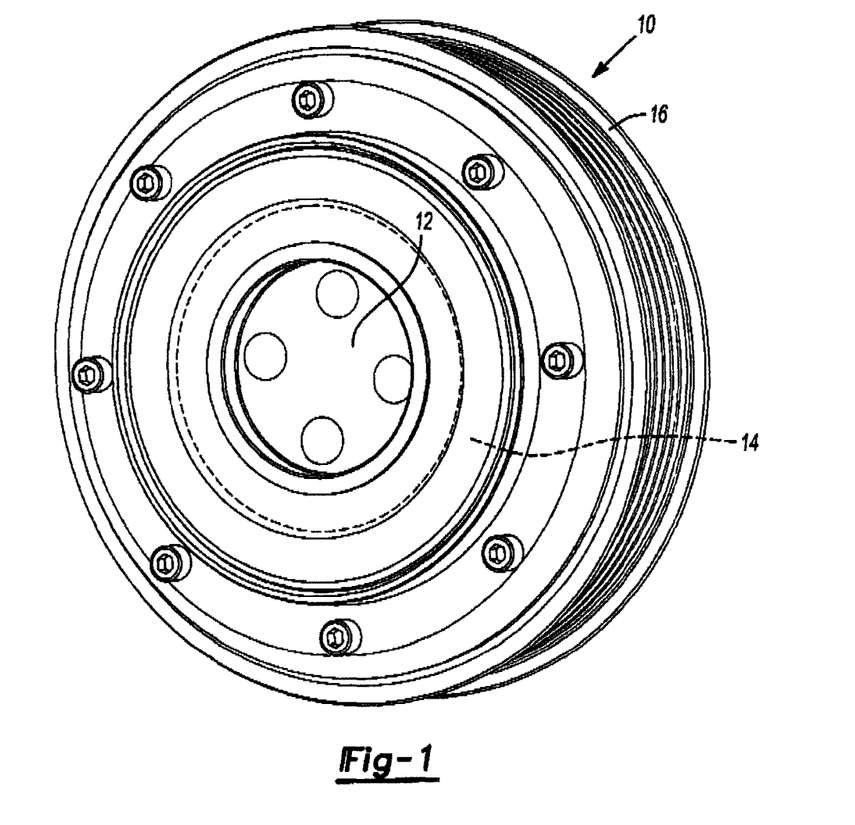
FIG. 1 is rear perspective view of an exemplary decoupler constructed in accordance with the teachings of the present disclosure.
Figure 2:
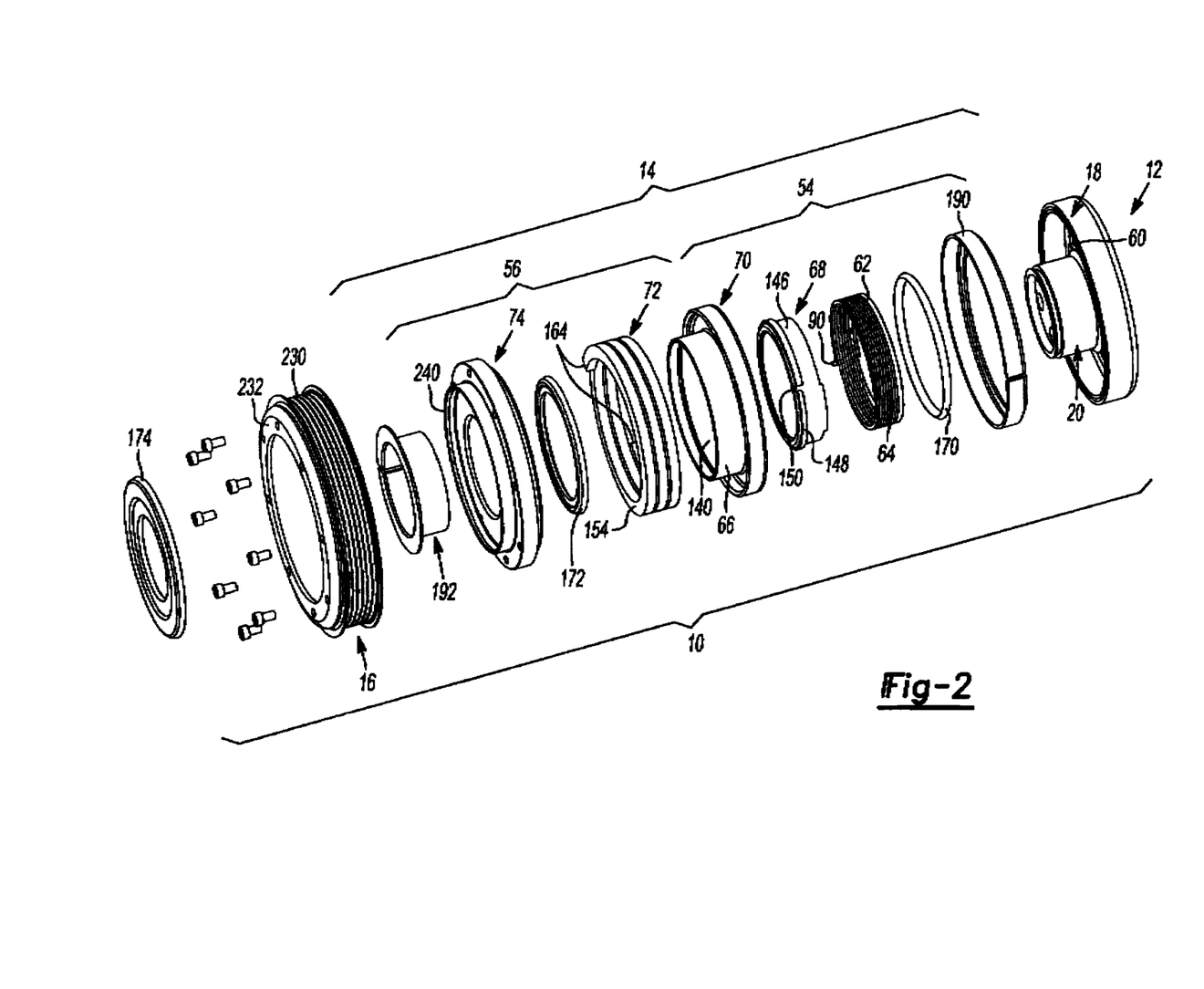
FIG. 2 is an exploded perspective view of the decoupler of FIG. 1.
Figure 3:
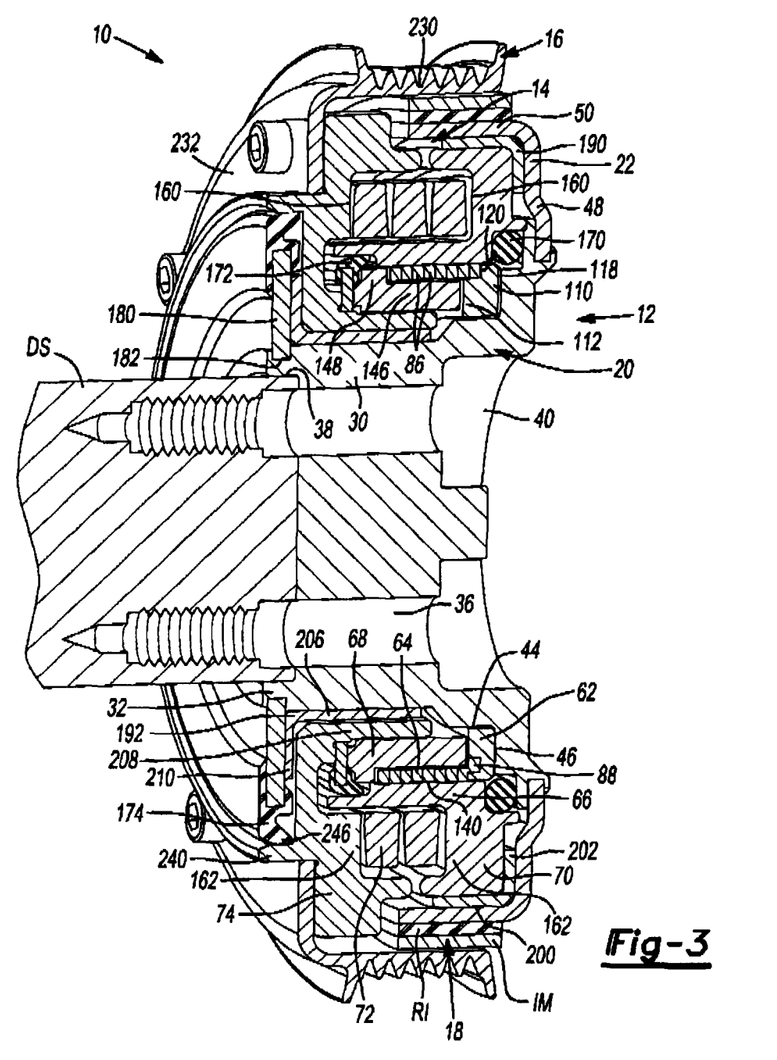
FIG. 3 is a longitudinal section view of the decoupler of FIG. 1.

With reference to FIGS. 1 through 3 of the drawings, a decoupler constructed in accordance with the teachings of the present disclosure is generally indicated by reference numeral 10. The decoupler 10 can comprise an input member 12, a clutch and isolation system 14, an output member 16 and a torsional vibration damper 18.

With reference to FIGS. 2 and 3, the input member 12 can have an input hub 20 with a hub member 30 and an annular shoulder 32. The hub member 30 can be configured to couple the decoupler 10 to a driving shaft DS in any desired manner. In the particular example provided, a plurality of through-holes 36 are formed through the hub member 30 and are configured to receive threaded fasteners (not specifically shown) there through that are threadably coupled to the driving shaft DS. It will be appreciated that the input hub 20 and the driving shaft DS could have features that permit the centerline of the input hub 20 to be accurately aligned to a rotational axis of the driving shaft DS. In the particular example provided, the fit between a bore 38 in the hub member 30 and a guide portion 40 of the driving shaft DS is configured to position the centerline relative to the rotational axis to a desired degree. The annular shoulder 32 can comprise a circumferentially-extending surface 44 and a radially-extending surface 46.

The torsional vibration damper 18, which is not shown to scale, can comprise any type of torsional vibration damping means, including damping means that employ viscous shear force, tangential spring force and/or friction force to dampen torsional vibrations. In the particular example provided, the torsional vibration damper 18 employs tangential spring force and comprises a damper input member 22, a resilient member RI and an inertia member IM. The damper input member 22 can be a discrete component that can be coupled to the input hub 20 in any suitable manner. In the particular example provided, the damper input member 22 is welded to the input hub 20, which permits the input hub 20 to be formed via a process that includes forging while the damper input member 22 can be formed of a sheet steel material. It will be appreciated, however, that various other coupling means may be employed if the damper input member 22 is formed separately from the input hub 20, including one or more threaded fasteners and/or an interference fit. The damper input member 22 can have a leg portion 48, which can extend radially from a portion of the input hub 20, such as the annular shoulder 32, and an arm portion 50 that can be coupled to a distal end of the leg portion 48 and which can extend forwardly from the leg portion 48 so as to be disposed concentrically about the input hub 20. The resilient member RI can comprise an elastomer that can be coupled to (e.g., bonded, frictionally engaged) to the damper input member 22 and the inertia member IM. The inertia member IM can be an annular structure that can be sized in a manner that is well known in the art to at least partly cancel torsional vibration at a predetermined frequency.

The clutch and isolation system 14 can comprise a one-way clutch 54 and a torsional isolator 56. In the particular example provided, the one-way clutch 54 comprises a clutch input structure 60, a carrier 62, a clutch spring 64, a clutch output member 66 and a spring support 68, while the torsional isolator 56 comprises an input driver 70, at least one isolating spring 72, and an output driver 74.

Figure 4:
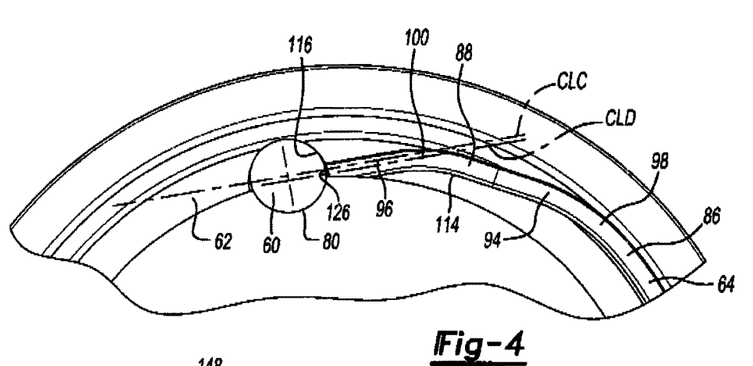
FIG. 4 is a rear view of a portion of the decoupler of FIG. 1, illustrating a carrier, a clutch spring and a clutch input structure coupled to an input hub.

With reference to FIGS. 2 through 4, the clutch input structure 60 can be coupled to the annular shoulder 32 such that the clutch input structure 60 will co-rotate with the input member 12. The clutch input structure 60 can have an abutting face 80 that can extend from the radially-extending surface 46 of the annular shoulder 32.

Figure 5:
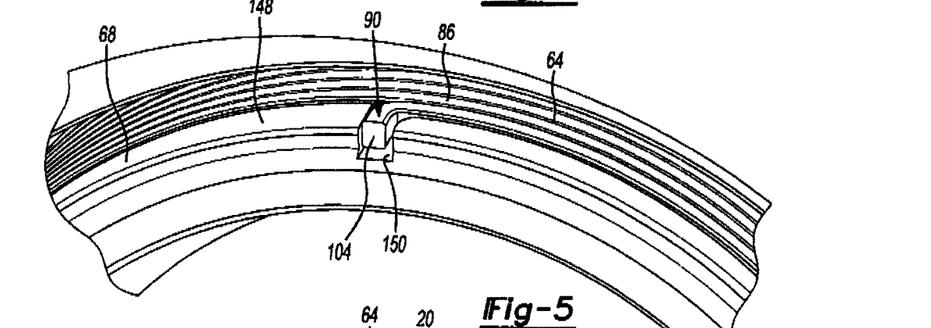
FIG. 5 is a perspective view of a portion of the decoupler of FIG. 1, illustrating a second end of the clutch spring mounted to a spring support.

The clutch spring 64 can be formed of spring wire of an appropriate cross-sectional shape and can comprise a plurality of helical coils 86 that are disposed between a first end 88 and a second end 90. The first end 88 can extend radially inwardly from an adjacent one of the helical coils 86 and can comprise first and second linear segments 94 and 96, respectively, a first transition zone 98, and a second transition zone 100. The first linear segment 94 can extend radially inwardly from the adjacent one of the helical coils 86 at a first angle, while the second linear segment 96 can extend radially inwardly from the adjacent one of the helical coils 86 at a second, larger angle. The first transition zone 98 can couple the first linear segment 94 to the adjacent one of the helical coils 86, while the second transition zone 100 can couple the second linear segment 96 to the first linear segment 94. With reference to FIGS. 2 and 5, the second end 90 can comprise a tang 104 that can extend parallel to a central axis about which the helical coils 86 are formed.

Returning to FIGS. 2 through 4, the carrier 62 can be received around the annular shoulder 32 and can be configured to support the clutch spring 64 as rotary power is transmitted from the clutch input structure 60 to the clutch spring 64. The carrier 62 can be formed of a suitable material, such as steel or plastic, and can comprise a flange portion 110, a sleeve portion 112, a groove 114 and a carrier abutment wall 116. The flange portion 110 can be an annular structure having a front surface 118, which can abut the radially-extending surface 46 of the annular shoulder 32, and a rear surface 120 that can abut the adjacent one of the helical coils 86 of the clutch spring 64. In the example provided, portion of the rear surface 120 that abuts the clutch spring 64 is helically shaped to match the contour of the helical coils 86 of the clutch spring 64. The sleeve portion 112 can be an annular structure that can extend axially from the flange portion 110. The sleeve portion 112 can be sized to be received in the helical coils 86 of the clutch spring 64 to support one or more of the helical coils 86 and/or to maintain the carrier 62 and the first end 88 of the clutch spring 64 about a common rotational axis. The groove 114 can be configured to receive the first end 88 of the clutch spring 64 and can extend through the circumference of the sleeve portion 112 and optionally through the carrier abutment wall 116. The carrier abutment wall 116 can abut the clutch input structure 60 and if the groove 114 extends through the carrier abutment wall 116, an axial end face 126 of the wire that forms the clutch spring 64 can also abut the abutting face 80 of the clutch input structure 60. In the particular example provided, the clutch input structure 60 is a cylindrical pin (so that the abutting face 80 is cylindrically shaped) and is located relative to the axial end face 126 such that a centerline CLC of the clutch input structure 60 (i.e., taken perpendicular to the axial end face 126) is spaced radially outwardly of a longitudinal centerline CLD of the wire that forms the clutch spring 64 at a point where the centerline CLD intersects the axial end face 126. Construction in this manner can locate the centerline CLD between the centerline CLD and the rotational axis of the decoupler 10, which may help to trap the wire that forms the clutch spring 64 in some situations. It will be appreciated, however, that other configurations of the clutch input structure 60 and the clutch spring 64 are within the scope of the present disclosure and as such, the particular example illustrated and described herein will be understood as not limiting the invention that is disclosed herein.

If desired, the carrier 62 can be configured to be non-rotatably coupled to the input member 12. In the particular example provided, the flange portion 110 of the carrier 62 is notched as shown in FIG. 4 to receive the clutch input structure 60 to maintain the carrier 62 (and therefore the first end 88 of the clutch spring 64) in a predetermined orientation relative to the clutch input structure 60.

While the carrier 62 has been described as having a flange portion 110 that is formed as a continuous annular structure, it will be appreciated that the carrier 62 could be formed in the alternative as a discontinuous annular structure. In this regard, the flange portion 110 could be formed with a radial slit (not shown) to provide the carrier 62 with a greater degree of circumferential compliance. As another alternative, the carrier 62 could be press-fit to the annular shoulder 32 to couple the carrier to the input member 12 for rotation therewith.

Figure 6:
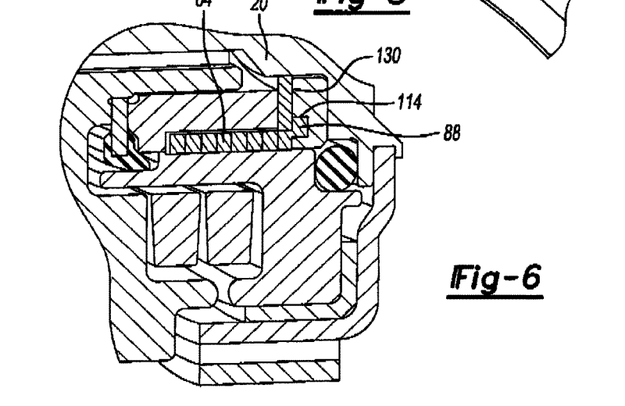
FIG. 6 is a portion of a longitudinal section view of an alternately constructed decoupler having a backing member.

With brief reference to FIG. 6, a backing member 130 can be coupled to the input hub 20 to inhibit withdrawal of the first end 88 of the clutch spring 64 from the groove 114. In the example provided, the backing member 130 is formed of steel and is press-fit to the input hub 20, but it will be appreciated that other coupling methods could be employed. For example, the backing member 130 could comprise an external snap-ring or thrust washer (not shown) that could be coupled to the input hub 20 in an appropriate manner, such as being received in a correspondingly shaped ring groove (not shown).

Returning to FIGS. 2 and 3, the clutch output member 66 can comprise a circumferentially extending structure that can be disposed about the helical coils 86 of the clutch spring 64. The clutch output member 66 can comprise a clutch surface 140 that can be engaged by the helical coils 86 of the clutch spring 64 as will be discussed in detail, below.

With reference to FIGS. 2, 3 and 5, the spring support 68 can comprise a tubular body portion 146 and an end flange 148. The tubular body portion 146 can be configured to be received between the hub member 30 and the helical coils 86 of the clutch spring 64. The end flange 148 can be configured to abut an axial end of the clutch spring 64 opposite the carrier 62. In the particular example provided, the end flange 148 has a helically contoured surface that directly abuts an axial end of the clutch spring 64. A tang slot 150 can be formed in the spring support 68 and can be sized to receive the tang 104 to couple the spring support 68 to the second end 90 of the clutch spring 64 for rotation therewith.

Returning to FIGS. 2 and 3, the at least one isolating spring 72 can be received between the input driver 70 and the output driver 74 to transmit rotary power therebetween. In the example provided, the at least one isolating spring 72 comprises a single helical torsion spring 154, which opens (i.e., expands in a radial direction) with the transmission of increasing amounts of torque there through, while each of the input and output drivers 70 and 74 includes a helical spring groove 160 and a driver lug 162. It will be appreciated, however, that other materials, such as an elastomer (e.g., rubber, resilient foam) could be employed in addition to or in lieu of the single helical torsion spring 154 that is depicted in the illustrated example, and/or that the at least one isolating spring 72 could comprise one or more springs that are disposed circumferentially about the input hub 20. The helical torsion spring 154 can be axially compressed between the input driver 70 and the output driver 74. In the example provided, the helical torsion spring 154 is wound in a direction that is opposite the direction in which the clutch spring 64 is wound, but it will be appreciated that other configurations are within the scope of the present disclosure. It will also be appreciated that a plurality of circumferentially spaced-apart helical coil springs could be mounted between the input driver 70 and the output driver 74 in the alternative. The helical spring groove 160 is configured to abut a corresponding axial end of the helical torsion spring 154, while the driver lug 162 is configured to abut an associated axial end face 164 of the wire that forms the helical torsion spring 154. The input driver 70 can be coupled to the clutch output member 66 for rotation therewith. In the particular example provided, the input driver 70 is integrally formed with the clutch output member 66 such that the clutch output member 66 is disposed axially along the length of the helical torsion spring 154. It will be appreciated that construction in this manner positions the at least a portion of the helical coils 86 of the clutch spring 64 in an axially overlapping manner with at least a portion of the coils of the helical torsion spring 154.

One or more seals may be incorporated into the decoupler 10 to inhibit ingress of water and/or debris into the interior of the decoupler 10, and/or to maintain a lubricant in a portion of the decoupler 10. In the example provided, a first seal 170 is disposed between the annular shoulder 32 and the clutch output member 66, a second seal 172 is disposed between the output driver 74 and the clutch output member 66, and a third seal is disposed between the input hub 20 and the output driver 74. The first, second and third seals 170, 172 and 174 cooperate to seal an internal cavity in which the clutch spring 64 is disposed. Accordingly, a suitable lubricant, such as a grease, an oil or a traction fluid, could be employed to lubricate the helical coils 86 and the clutch surface 140. While the second and third seals 172 and 174 are illustrated as being face seals, it will be appreciated that any type of seal could be employed. The third seal 174 can comprise a retaining member, such as a retaining ring 180, that can be received in a groove 182 formed in the input hub 20. The retaining member (e.g., retaining ring 180) can limit axial movement of the output driver 74 away from the input driver 70.

One or more bearings can be employed to support the input and output drivers 70 and 74 relative to the input hub 20. In the particular example provided, a first bearing 190 is disposed between the input driver 70 and the damper input member 22, while a second bearing 192 is disposed between the hub member 30 and the output driver 74. The first and second bearings 190 and 192 can be any type of bearing, but in the particular example provided, are thrust bushings. The first bearing 190 can comprise an annular portion 200, which can be configured to support the input driver 70 relative to a rotational axis of the input hub 20, and a radially extending portion 202 that can be configured to limit movement of the input driver 70 axially along the rotational axis of the input hub 20 in a direction toward the damper input member 22. Similarly, the second bearing 192 can comprise an annular portion 206, which can be received between the hub member 30 and an annular collar 208 on the output driver 74 and configured to support the output driver 74 relative to the rotational axis of the input hub 20, and a radially extending portion 210 that can be configured to limit axial movement of the output driver 74 axially along the rotational axis of the input hub 20 in a direction away from the damper input member 22. In the example illustrated, the radially extending portion 210 is depicted as abutting the third seal 174, but it will be appreciated that the radially extending portion 210 could contact another structure, such as a rib (not shown) formed on the hub member 30 or a retaining ring (not shown) received in a groove (not shown) in the hub member 30.

The output member 16 can be any type of structure that is configured to provide a rotary output, such as a pulley, a gear, a sprocket or a roller. In the particular example provided, the output member 16 comprises a pulley sheave 230 that is configured to engage a poly-V belt. The output member 16 can be rotatably coupled to the output driver 74 in any desired manner, such as a plurality of bolts, and/or one or more welds. In the example provided, the output member 16 includes an annular mounting hub 232 that is received over an annular, axially-extending rib 240 on the output driver 74. The circumferentially outer side of the rib 240 can align the output member 16 to the rotational axis of the output driver 74, while a seal lip 246 of the third seal 174 can sealingly engage the circumferentially inner side of the rib 240.

In operation, rotation of the driving shaft DS in the predetermined rotational direction will cause corresponding rotation of the input hub 20 in the predetermined rotational direction so that the helical coils 86 of the clutch spring 64 will engage the clutch surface 140 and transmit rotary power to the clutch output member 66. Since the input driver 70 is rotationally coupled to the clutch output member 66, rotary power can be input to the torsional isolator 56 via the input driver 70. Rotary power introduced to the input driver 70 is transmitted through the helical torsion spring 154, the output driver 74 and into the output member 16 (i.e., to permit the output member 16 to provide rotary power to another device or structure, such as a poly-V belt (not shown) in the particular example provided). It will be appreciated that transient torsional vibration associated with the rotary power that is transmitted into the torsional isolator 56 can be attenuated to one degree or another via the at least one isolating spring 72.

In situations where the rotational speed of the output member 16 in the predetermined rotational direction exceeds the rotational speed of the input hub 20, the at least one isolating spring 72 will unload. A means can be provided to permit a relatively small torsional load to be transmitted from the output driver 74 to the input driver 70. The output driver 74 and the input driver 70 could have, for example, two or more mating lugs (not shown) that facilitate the transmission of rotary power from the output driver 74 to the input driver 70. In the example provided, the axial compression on the helical torsion spring 154 is sufficiently large so as to permit friction forces (i.e., between the ends of the helical torsion spring 154 and the input and output drivers 70 and 74) to carry a modest level of torque so that the output driver 74 can effectively back drive the input driver 70 (and the clutch output member 66 therewith). The back driving of the clutch output member 66 tends to cause the helical coils 86 of the clutch spring 64 to contract in a circumferential direction so that the clutch spring 64 at least partly disengages the clutch surface 140 of the clutch output member 66 to an extent where the clutch output member 66, the input driver 70, the output driver 74 and the output member 16 can over-run the input hub 20 in the predetermined rotational direction.

In situations where the at least one isolating spring 72 comprises a torsion spring that is wrapped coaxially about the rotational axis of the decoupler 10, those of skill in the art will appreciate from this disclosure that the rotational balance of the decoupler 10 will change as the torsional load carried by the decoupler 10 changes. To minimize the effect of rotational imbalance, the decoupler 10 could be formed so as to be rotationally imbalanced when no rotary load is transmitted through the decoupler 10, and the rotational imbalance can lessen as the rotary load transmitted through the decoupler 10 increases to a predetermined magnitude. Stated another way, the decoupler 10 can be configured to be rotationally balanced when a rotary load of a predetermined magnitude is transmitted through the decoupler 10. Rotation of the output driver 74 relative to the input hub 20 can be limited to a predetermined range having end points corresponding to a predetermined minimum loading of the at least one isolating spring 72 and a predetermined maximum loading of the at least one isolating spring 72.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

Table of Elements decoupler 10
input member 12
clutch and isolation system 14
output member 16
torsional vibration damper 18
input hub 20
damper input member 22
hub member 30
annular shoulder 32
through-holes 36
bore 38
guide portion 40
circumferentially-extending surface 44
radially-extending surface 46
leg portion 48
arm portion 50
one-way clutch 54
torsional isolator 56
clutch input structure 60
carrier 62
clutch spring 64
clutch output member 66
spring support 68
input driver 70
at least one isolating spring 72
output driver 74
abutting face 80
helical coils 86
first end 88
second end 90
first linear segment 94
second linear segment 96
first transition zone 98
second transition zone 100
tang 104
flange portion 110
sleeve portion 112
groove 114
carrier abutment wall 116
front surface 118
rear surface 120
axial end face 126
backing member 130
clutch surface 140
tubular body portion 146
end flange 148
tang slot 150
helical torsion spring 154
helical spring groove 160
driver lug 162

-continued

Table of Elements axial end face 164
first seal 170
second seal 172
third seal 174
retaining ring 180
groove 182
first bearing 190
second bearing 192
annular portion 200
radially extending portion 202
annular portion 206
annular collar 208
radially extending portion 210
pulley sheave 230
mounting hub 232
rib 240
seal lip 246

What is claimed is:

1. A decoupler comprising:
an input hub;
an output member; and
a clutch and isolation system having a one-way clutch and a torsional isolator, the one-way clutch having a clutch input structure, a clutch spring, a carrier, and a clutch output structure, the clutch input structure being fixedly coupled to the input hub for rotation therewith, the clutch spring being formed of wire and having a plurality of coils and a first end that is mounted to the carrier, the carrier being non-rotatably mounted to the input hub and orienting an axial end face of the wire that forms the first end of the clutch spring against the clutch input structure, the clutch output structure having a clutch surface, wherein the coils of the clutch spring are configured to expand against the clutch surface to transmit rotary power from the input hub to the clutch output structure in a first rotational direction, and wherein the coils of the clutch spring are configured to contract to permit the clutch output structure to overrun the input hub in the first rotational direction, the torsional isolator comprising an input driver, an output driver and at least one spring that is configured to transmit torque in the first rotational direction between the input driver and the output driver, the input driver being coupled to the clutch output structure for rotation therewith, the output member being coupled to the output driver for rotation therewith;
wherein the at least one spring of the torsional isolator is disposed radially outwardly of the clutch spring.

2. The decoupler of claim 1, wherein the at least one spring of the torsional isolator comprises a single helical torsion spring that is mounted coaxially about the clutch spring.

3. The decoupler of claim 2, wherein the single helical torsion spring and the clutch spring are wound in opposite directions.

4. The decoupler of claim 1, wherein the one-way clutch further comprises a spring support, wherein the spring support comprises a body portion that is received between the coils of the clutch spring and the input hub, the spring support being rotatable relative to the input hub.

5. The decoupler of claim 4, wherein the clutch spring further comprises a second end opposite the first end, the second end having a tang that is mounted to the spring support.

6. The decoupler of claim 1, further comprising a seal system that seals a cavity within the clutch and isolation system in which the clutch spring is disposed.

7. The decoupler of claim 6, wherein a lubricant is received in the cavity.

8. The decoupler of claim 6, wherein the seal system comprises at least one face seal.

9. The decoupler of claim 1, wherein the carrier defines a groove into which the first end of the clutch spring is received and wherein the one-way clutch further comprises a backing member that is fixedly coupled to the input hub, the backing member abutting the first end of the spring clutch to inhibit withdrawal of the first end from the groove.

10. The decoupler of claim 9, wherein the backing member is press-fit to the input hub.

11. The decoupler of claim 1, wherein when no rotary load is transmitted through the decoupler, the decoupler is rotationally imbalanced, and wherein the rotational imbalance of the decoupler lessens as the rotary load transmitted through the decoupler increases to a predetermined magnitude.

12. The decoupler of claim 1, wherein rotation of the output driver relative to the input hub is limited to a predetermined range having endpoints corresponding to a predetermined minimum loading of the at least one spring of the torsional isolator and a predetermined maximum loading of the at least one spring of the torsional isolator.

13. The decoupler of claim 1, further comprising a torsional vibration damper mounted to the input hub.

14. The decoupler of claim 1, wherein the clutch input structure comprises a cylindrical surface and wherein a centerline of the cylindrical surface taken parallel to a longitudinal centerline of the wire that forms the clutch spring at a location where the longitudinal centerline of the wire intersects the axial end face is disposed radially outwardly of the longitudinal centerline of the wire at the location where the longitudinal centerline of the wire intersects the axial end face.

* * * * *